(12) United States Patent
Vullings

(10) Patent No.: US 9,188,142 B2
(45) Date of Patent: Nov. 17, 2015

(54) HINGED ARM MECHANICALLY ACTIVATED FASTENER

(75) Inventor: Peter Vullings, Palmerston North (NZ)

(73) Assignee: EMPIRE TECHNOLOGY DEVELOPMENT, Wilmington, DE (US)

( * ) Notice: Subject to any disclaimer, the term of this patent is extended or adjusted under 35 U.S.C. 154(b) by 193 days.

(21) Appl. No.: 13/445,805

(22) Filed: Apr. 12, 2012

(65) Prior Publication Data

US 2013/0269169 A1 Oct. 17, 2013

Related U.S. Application Data

(63) Continuation of application No. PCT/US2011/048330, filed on Aug. 18, 2011.

(51) Int. Cl.

| F16B 13/04 | (2006.01) |
|---|---|
| B23P 11/00 | (2006.01) |
| B23P 17/00 | (2006.01) |
| F16B 13/08 | (2006.01) |
| F16B 5/06 | (2006.01) |

(52) U.S. Cl.
CPC ........... *F16B 13/0808* (2013.01); *F16B 5/0642* (2013.01); *Y10T 29/49948* (2015.01)

(58) Field of Classification Search
CPC .... F16B 13/0808; F16B 5/0642; F16B 13/08; F16B 13/00; F16B 13/12; F16B 21/00; F16B 5/00; F16B 5/02; Y10T 29/49948; Y10T 29/49947; Y10T 29/49963; B23P 11/00
USPC ........... 29/525.01, 525.02, 525.11, 434, 437, 29/438; 411/34, 38, 340, 344
See application file for complete search history.

(56) References Cited

U.S. PATENT DOCUMENTS 330,119 A * 11/1885 Holder ............................ 411/34
3,487,746 A    4/1968 Kapnek
(Continued)

FOREIGN PATENT DOCUMENTS

GB    2441018 A    2/2008

OTHER PUBLICATIONS

International Search Report and Written Opinion dated Jan. 13, 2012 for International Application Serial No. PCT/US2011/048330.

(Continued)

*Primary Examiner* — Essama Omgba
*Assistant Examiner* — Darrell C Ford
(74) *Attorney, Agent, or Firm* — Amin, Turocy & Watson, LLP

(57) ABSTRACT

A fastener attached to a first member releasably connects the first member to a second member. The fastener can have a head that moves towards or away from a housing that is separate from, or part of, the first member. A linkage assembly has linkage arm(s) extending from the head to the housing, or to the first member, and the fastener can be pivotally connected at a first end to the housing, or to the first member, and also to the head at a second end. Each linkage arm can define a joint located between the first and second ends. When unfastened, the head can be positioned away from the housing, extending each linkage arm. When fastened, the head may be positioned towards the housing, whereby the joint of each linkage arm can become displaced laterally in the fastener, e.g., connecting the second member to the first member.

26 Claims, 8 Drawing Sheets

(56) References Cited

U.S. PATENT DOCUMENTS

| | | | | |
|---|---|---|---|---|
| 4,116,104 A * | 9/1978 | Kennedy | | 411/427 |
| 4,286,497 A * | 9/1981 | Shamah | | 411/342 |
| 4,295,304 A | 10/1981 | Kim | | |
| 4,457,653 A * | 7/1984 | Leib | | 411/342 |
| 4,642,009 A * | 2/1987 | Fischer | | 411/38 |
| 4,662,808 A * | 5/1987 | Camilleri | | 411/340 |
| 4,668,144 A * | 5/1987 | Giannuzzi | | 411/342 |
| 4,793,755 A * | 12/1988 | Brown | | 411/342 |
| 4,828,439 A * | 5/1989 | Giannuzzi | | 411/37 |
| 4,920,618 A * | 5/1990 | Iguchi | | 24/453 |
| 5,018,919 A * | 5/1991 | Stephan | | 411/33 |
| 5,207,750 A * | 5/1993 | Rapata | | 411/38 |
| 5,308,204 A * | 5/1994 | Moen | | 411/37 |
| 5,425,609 A * | 6/1995 | Smith | | 411/344 |
| 5,509,182 A * | 4/1996 | Nakanishi | | 24/297 |
| 5,690,454 A * | 11/1997 | Smith | | 411/30 |
| 5,775,859 A * | 7/1998 | Anscher | | 411/38 |
| 5,875,606 A * | 3/1999 | Jensen | | 52/741.41 |
| 6,004,088 A * | 12/1999 | Hunt | | 411/344 |
| 6,036,418 A | 3/2000 | Stencel et al. | | |
| 6,615,459 B2 * | 9/2003 | Sano | | 24/453 |
| 6,660,008 B1 * | 12/2003 | Foerster et al. | | 606/327 |
| 6,981,559 B2 * | 1/2006 | Rubie et al. | | 173/184 |
| 7,887,273 B2 * | 2/2011 | Vigliotti et al. | | 411/38 |
| 8,007,215 B2 * | 8/2011 | Chen | | 411/60.2 |
| 8,109,705 B1 * | 2/2012 | Brown et al. | | 411/344 |
| 8,764,364 B2 * | 7/2014 | Brown et al. | | 411/340 |
| 2002/0150442 A1 * | 10/2002 | Remmers | | 411/340 |
| 2003/0053881 A1 * | 3/2003 | Huang et al. | | 411/34 |
| 2006/0072979 A1 * | 4/2006 | McDuff et al. | | 411/38 |
| 2006/0182511 A1 * | 8/2006 | Dessureau | | 411/38 |
| 2006/0222474 A1 * | 10/2006 | Brown et al. | | 411/340 |
| 2010/0067975 A1 * | 3/2010 | Brown et al. | | 403/22 |
| 2010/0329819 A1 * | 12/2010 | Ernst | | 411/450 |
| 2011/0268527 A1 * | 11/2011 | Gaudron et al. | | 411/30 |
| 2012/0099942 A1 * | 4/2012 | Gaudron et al. | | 411/57.1 |
| 2013/0298381 A1 * | 11/2013 | Owen | | 29/525.01 |
| 2014/0109380 A1 * | 4/2014 | Vullings | | 29/525.08 |
| 2014/0234053 A1 * | 8/2014 | Martin | | 411/508 |

OTHER PUBLICATIONS

Quick-operating Fasteners; Machine Design.com; Published on Machine Design (http://machinedesign.com);created Nov. 15, 2002; 4 Pages.

"Mechanical Fasteners," archived version dated Jul. 28, 2011 accessed at [https://web.archive.org/web/20110728122535/http://www.globalspec.com/productfinder/mechanical_components/mechanical_fasteners], retrieved on Aug. 20, 2014, pp. 1-3.

* cited by examiner

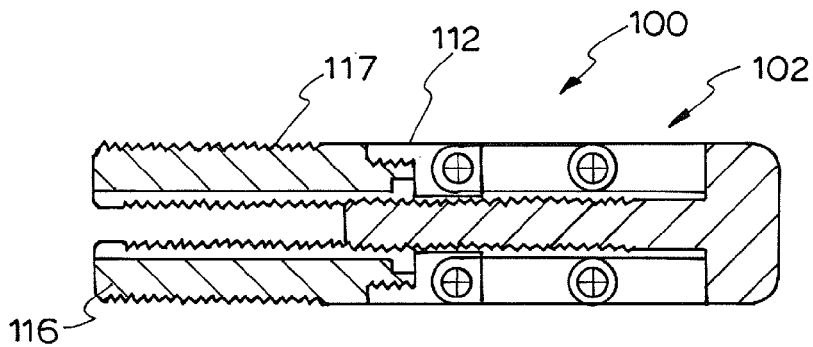
FIG.1A
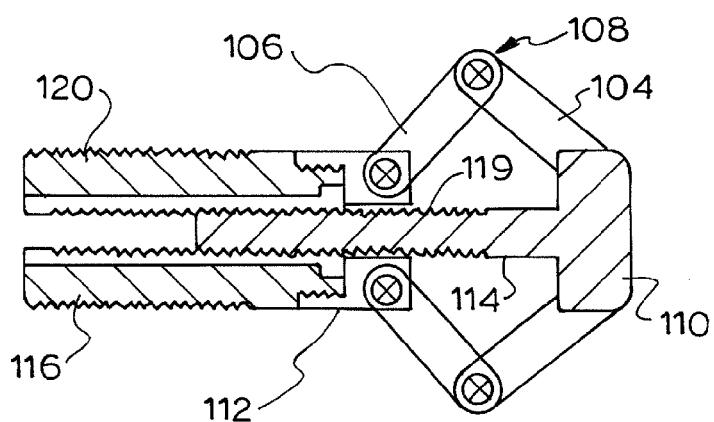
FIG.1B
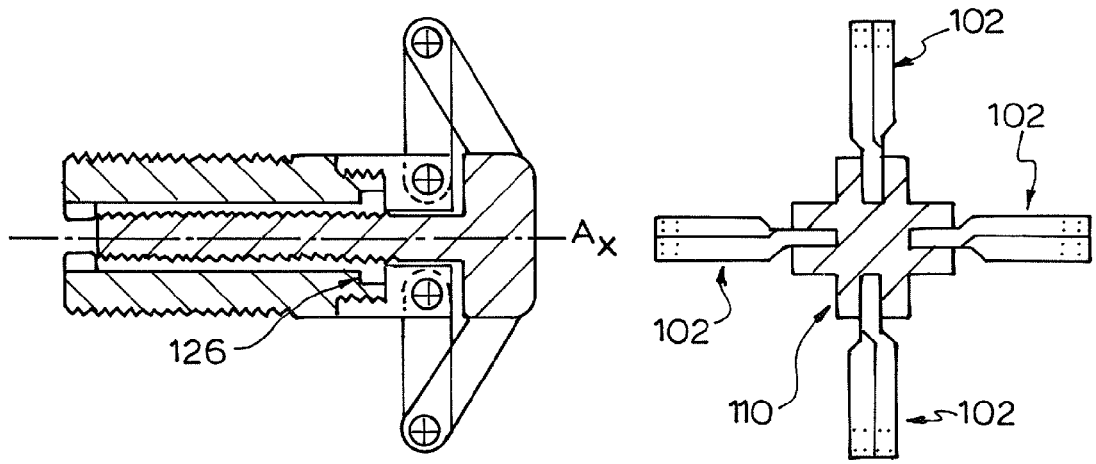
FIG.1C
FIG.1D

HINGED ARM MECHANICALLY ACTIVATED FASTENER

RELATED APPLICATION

The subject application is a continuation under U.S.C. §120 of PCT Application Serial No. PCT/US11/48330, filed Aug. 18, 2011, and entitled "HINGED ARM MECHANICALLY ACTIVATED FASTENER," the disclosure of which is incorporated herein by reference in its entirety.

BACKGROUND

Unless otherwise indicated herein, the materials described in this section are not prior art to the claims in this application and are not admitted to be prior art by inclusion in this section.

In prefabricated buildings, components such as internal walls, cabinetry, shelves, fixtures, fittings, etc are erected and fastened together on site, and may be uncoupled for internal space reorganization, for alternative use of space, or for deconstruction and removal of the building.

Where permanent fasteners have been employed to fasten such components together this can hinder the uncoupling of components and deconstruction of the building. Also, the components can be damaged, requiring repair or replacement.

SUMMARY

In some embodiments, a fastener is generally described. An example fastener can be configured to connect a first member to a second member. The example fastener may include a head. The head may be configured to move towards or away from a housing. The housing may be configured to attach to or form part of the first member. The example fastener may also include a linkage assembly. The linkage assembly may have at least one linkage arm configured to extend from the head to the housing or to the first member. The at least one linkage arm may be pivotally connected at a first end to the housing or to the first member. The at least one linkage arm may also be pivotally connected at a second end to the head. The at least one linkage arm may further include a joint located between the first end and the second end. In an unfastened orientation, the head may be positioned away from the housing, and the at least one linkage arm may be extended. In a fastened orientation, the head may be positioned towards the housing, and the joint of the at least one linkage arm may be displaced laterally in the fastener, to connect the second member to the first member.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the drawings:

FIGS. 1A to 1C respectively show diagrammatic side section views of a first example fastener in progressive stages of movement from an unfastened orientation to fastened orientation, with FIG. 1D showing an end view of the example fastener of FIG. 1C comprising four linkage arms;

DETAILED DESCRIPTION

Figure 2A:
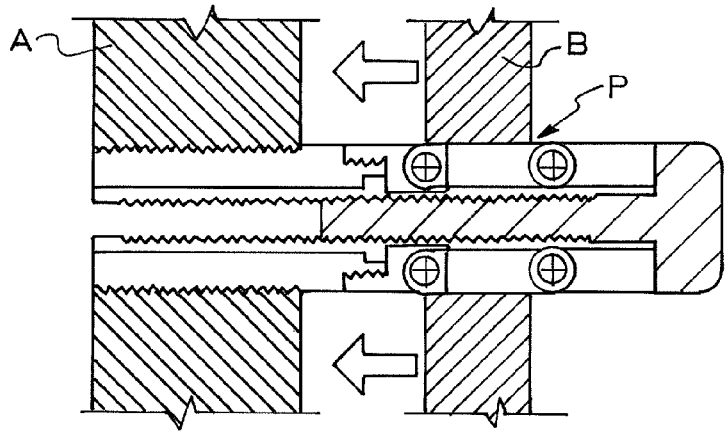
FIGS. 2A to 2C respectively show diagrammatic side section views of the first example fastener in progressive stages of movement from an unfastened orientation to fastened orientation when fastening a first member A to a second member B.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally directed, inter alia, to methods, apparatus, systems, and members that employ a fastener for securing a first member to a second member.

Briefly stated a fastener is generally disclosed. An example fastener can be attached to a first member (e.g. mounted to or incorporated in the first member). The fastener can enable the first member to be releasably connected to a second member. The example fastener has a head that can be configured to move towards or away from a housing. The housing may comprise a separate component, or may be defined by, or as part of, the first member. The example fastener may also have a linkage assembly that has one or up to four (or more) linkage arms. Each linkage arm may be configured to extend from the head to the housing, or may extend from the head to the first member. Each linkage arm may also be pivotally connected at a first end to the housing, or to the first member, and may also be pivotally connected at a second end to the head. Each linkage arm may define a joint located between the first and second ends.

In an unfastened orientation, the head may be positioned away from the housing, whereby each linkage arm may be extended (e.g. fully extended). In a fastened orientation, the head may be positioned towards the housing, whereby the joint of each linkage arm may become displaced laterally in the fastener. This lateral displacement can serve to connect the second member to the first member.

FIG. 1A is a diagrammatic side sectional representation of a first example fastener 100 that is arranged according to at least some embodiments described herein. In FIG. 1A, the example fastener 100 is in a non-fastening (or open) position. FIG. 2A is a diagrammatic side sectional representation of the first example fastener 100 in the non-fastening (open) position when attached to a first member A that is to be releasably secured to a second member B. In FIG. 2A, the example fastener 100 is able to be (and has been) inserted through a circular passage P in second member B. In the illustrated embodiments, the non-fastening position includes the arms fully extended (i.e. substantially parallel to the shaft of the fastener).

It should be appreciated that the non-fastening (open) position does not require the arms to be fully extended, and that the non-fastening position may be any position of the arms that allows the fastener to be inserted through the passage P. It should also be appreciated that the passage P may have any cross-sectional shape that allows the fastener to be inserted through the second member B. For example, the passage P may have a square, hexagonal, octagonal, etc cross-sectional shape, or may employ other examples of regular polygons for the cross-sectional profile. Alternatively, the passage P may have an irregular cross-sectional shape (e.g. that is related to the shape of the fastener and/or its number of arms), etc.

Figure 2B:
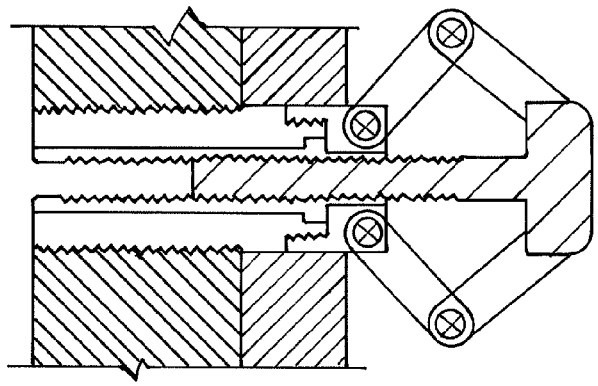

FIG. 1B is a diagrammatic side sectional representation of the first example fastener 100 in an intermediate position, with linkage arms of the fastener having moved away from the non-fastening position. FIG. 2B is a diagrammatic side sectional representation of the first example fastener 100 in the intermediate position when attached to a first member A, with the linkage arms of the example fastener 100 moving towards the second member B. The second member B may be caused by the linkage arms to move towards the first member A for securing thereat.

Figure 2C:
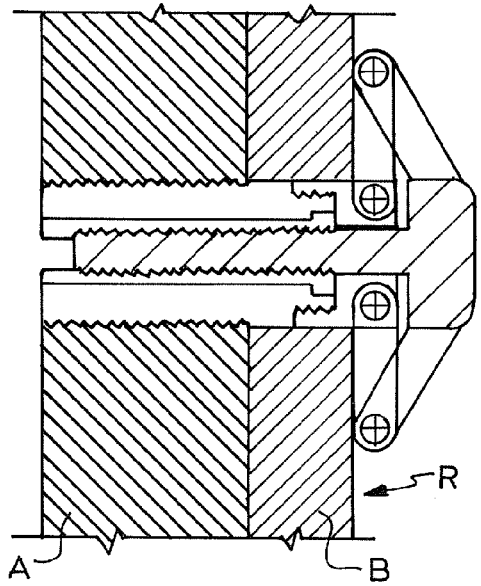

FIG. 1C is a diagrammatic side sectional representation of the first example fastener 100 in a fastening (or locked) position. FIG. 2C is a diagrammatic side sectional representation of the first example fastener 100 in the fastening (locked) position when attached to the first member A and releasably securing the second member B to the first member A. In FIG. 2C, the linkage arms of the example fastener 100 extend orthogonally in the fastener to abut a rear face R of member B. However it is to be appreciated that the in the fastening (locked) position the arms are not required to be orthogonal, and that the fastening position may include lateral arm positions that are other than orthogonal.

Figure 4A:
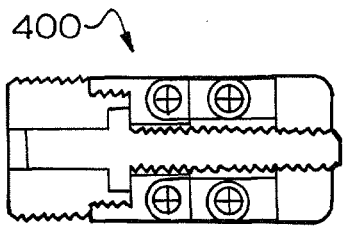
FIGS. 4A to 4C respectively show diagrammatic side section views of a second example fastener in progressive stages of movement from an unfastened orientation to fastened orientation.
Figure 4B:
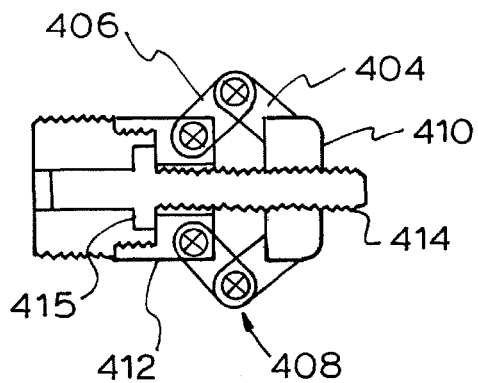
Figure 4C:
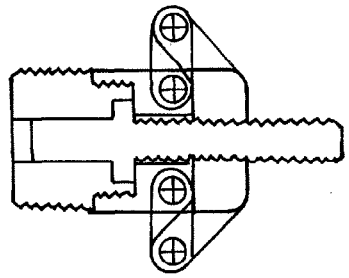
Figure 4D:
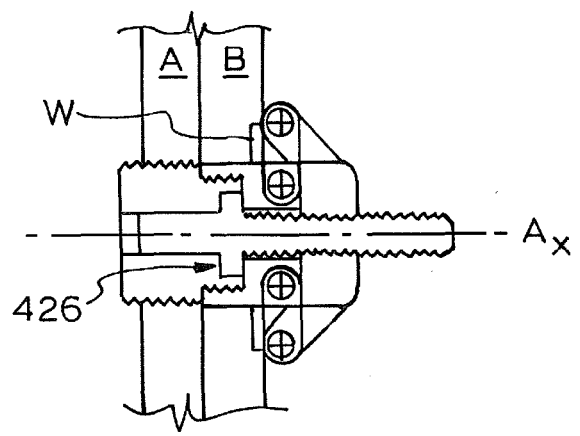
FIG. 4D shows the second example fastener in a fastened orientation when fastening a first member A to a second member B.
Figure 5A:
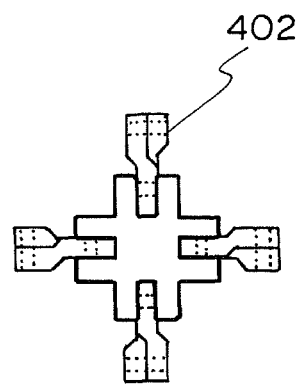
FIGS. 5A to 5D show end views of the second example fastener of FIG. 4C but in four-, three-, two- and single-arm configurations respectively.
Figure 5B:
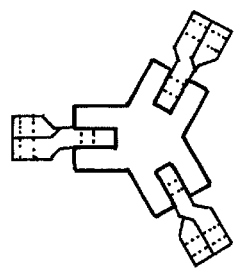
Figure 5C:
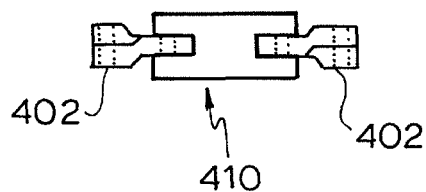
Figure 5D:
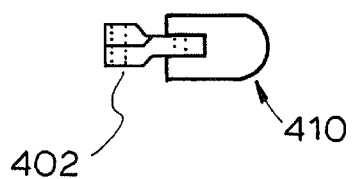
Figure 6A:
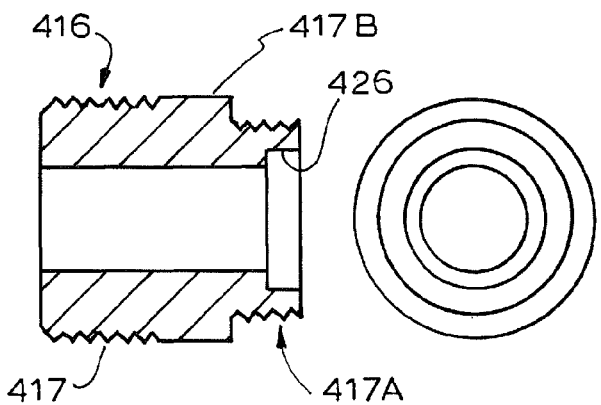
FIG. 6A shows diagrammatic views of a housing component of the second example fastener.
Figure 6B:
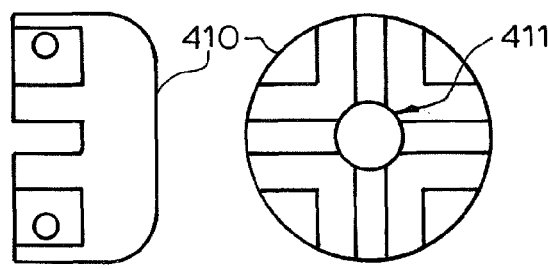
FIG. 6B shows diagrammatic views of a head component of the second example fastener.
Figure 6C:
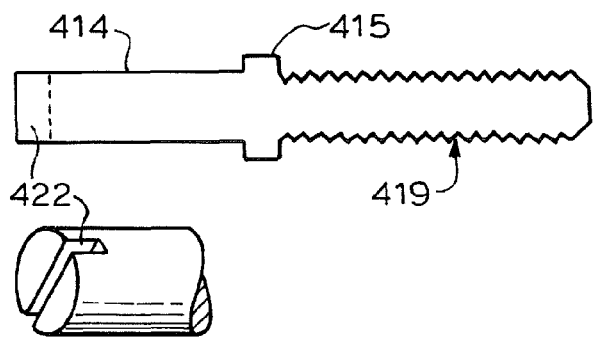
FIG. 6C shows diagrammatic views of a shaft component of the second example fastener.
Figure 6D:
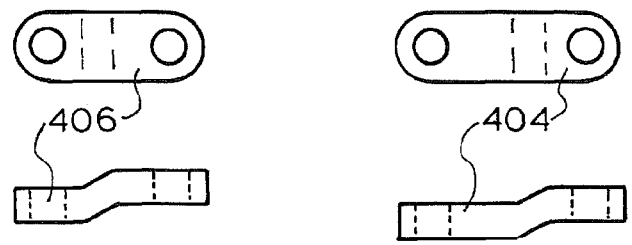
FIG. 6D shows diagrammatic views of linkage arm components of the second example fastener.
Figure 6E:
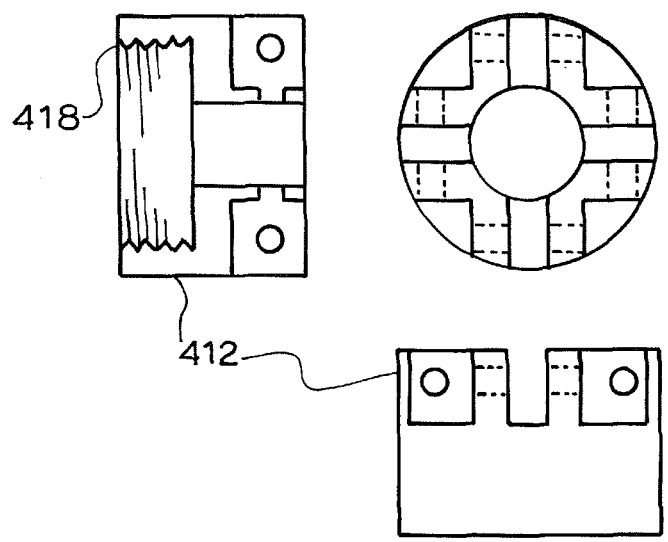
FIG. 6E shows diagrammatic views of a housing cap component of the second example fastener.
Figure 6F:
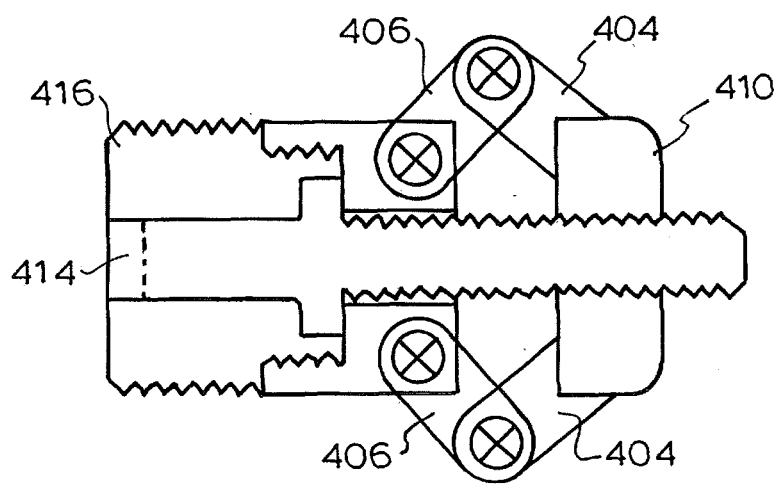
FIG. 6F shows a diagrammatic side section view of the second example fastener assembled from the components of FIGS. 6A to 6E, all arranged according to at least some embodiments described herein.

In a similar manner, FIGS. 4A to 4C show diagrammatic side sectional representations of a second example fastener 400, with FIG. 4A showing the fastener 400 in a non-fastening (or open) position, FIG. 4B showing the fastener 400 in an intermediate position, and FIG. 4C showing the fastener 400 in a fastening (or locked) position. FIG. 4D shows the fastener 400 in the fastening position when attached to a first member A and releasably securing a second member B to the first member A. In FIG. 4D, the linkage arms of the example fastener 400 again extend orthogonally in the fastener to abut a rear face of member B, though again it should be understood that an orthogonal orientation is not required for fastening.

FIG. 4D also shows a washer W located at rear face of member B and surrounding the passage P. Whilst the washer is not essential, the washer W can protect the surrounds of passage P from becoming damaged during the fastening action of either first example fastener 100 or second example fastener 400. For example, if the material of second member B is not wear resistant (e.g. is of plasterboard) then the washer can protect the second member B against wear and damage.

The first and second example fasteners 100 and 400 may be employed to secure a first member A that may take the form of a component such as a wall, door, shelf, fixture, cabinetry, furniture item, wall mounting, fixture, fitting, etc to a second member B that may also take the form of a component such as a wall, door, shelf, fixture, cabinetry, furniture item, wall mounting, fixture, fitting, etc. Such components A and B may be found in, for example, prefabricated buildings. Such component A and B may also be found in non-prefabricated buildings (e.g. that are built from the ground up). Like and unlike components A and B may be fastened together using the example fasteners 100 and 400.

It should be appreciated that the first and second example fasteners 100 and 400 are not limited to use with components in buildings, and may be used to secure together a range of different components in vehicles, installations, machinery, etc.

The first example fastener 100 of FIGS. 1 to 3 has four linkage arms 102 although, as schematically illustrated in FIGS. 5A to 5D, may have three, two or one linkage arm, or may have more than four linkage arms. The linkage arms 102 may be equidistantly spaced with respect to and around the fastener 100, though they could be unevenly spaced. Each linkage arm 102 has a long arm part 104 and a short arm part 106. The long arm part 104 and short arm part 106 are pivotally connected together at adjacent ends to define a joint 108. The long arm part 104 is pivotally connected at an opposite end to a head 110 and the short arm part 106 is pivotally connected at an opposite end to a housing cap 112. For multiple linkage arms, the head 110 is modified accordingly (i.e. additional pivot points are provided—see FIG. 5).

Figure 3A:
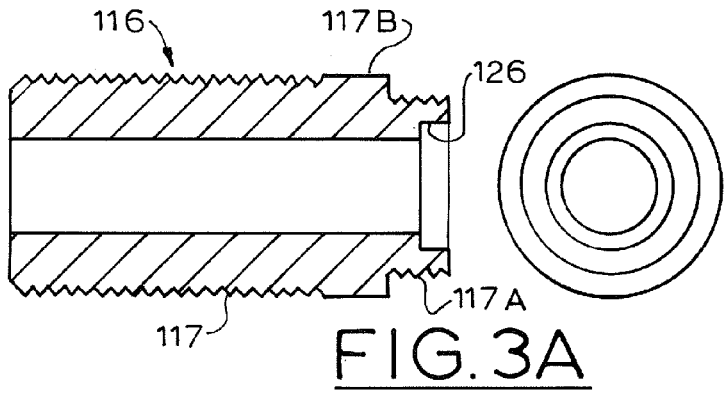
FIG. 3A shows diagrammatic views of a housing component of the first example fastener.
Figure 3B:
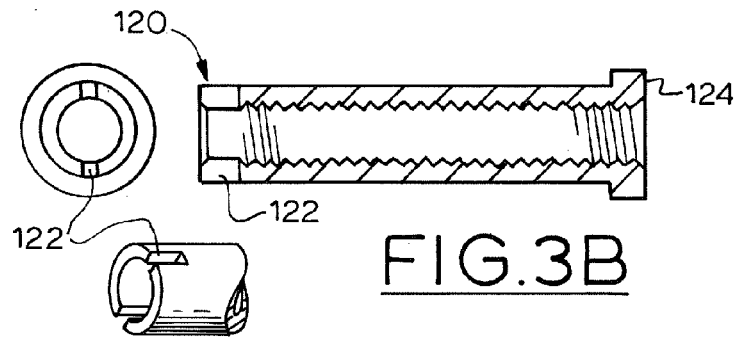
FIG. 3B shows diagrammatic views of a sleeve component of the first example fastener.
Figure 3C:
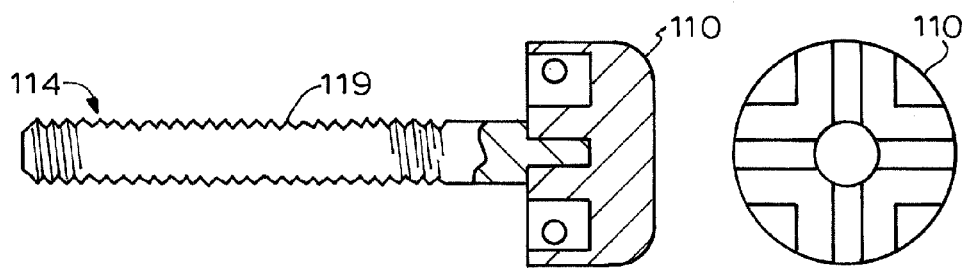
FIG. 3C shows diagrammatic views of a shaft component of the first example fastener.
Figure 3D:
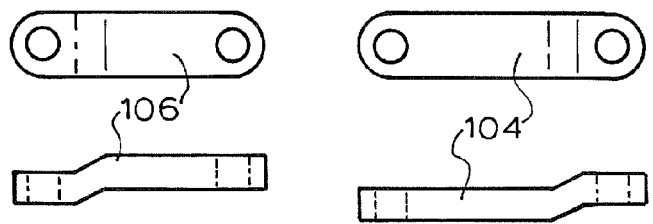
FIG. 3D shows diagrammatic views of linkage arm components of the first example fastener.
Figure 3E:
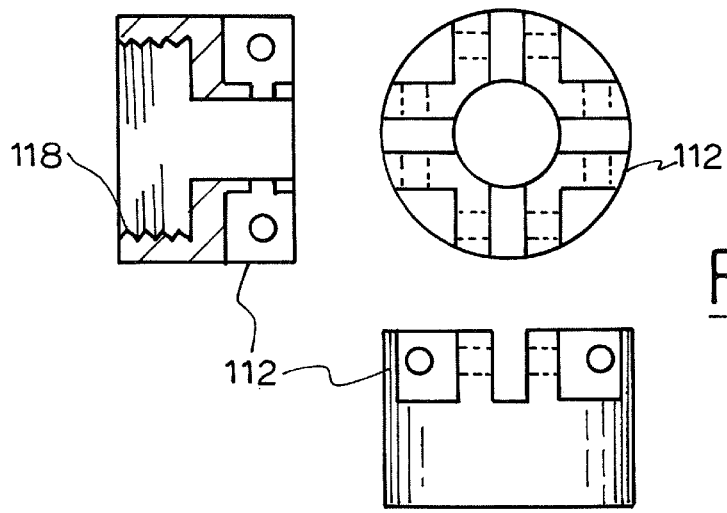
FIG. 3E shows diagrammatic views of a housing cap component of the first example fastener.
Figure 3F:
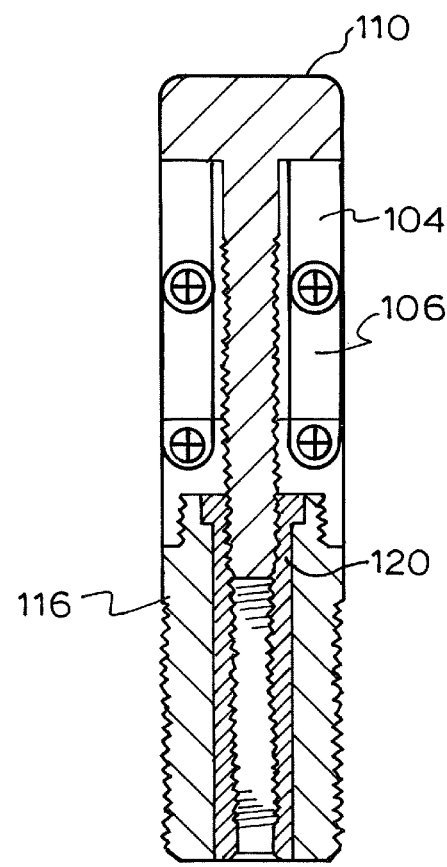
FIG. 3F shows a diagrammatic side section view of the first example fastener assembled from the components of FIGS. 3A to 3E.

It will also be seen in FIG. 3D that each of the long arm part 104 and short arm part 106 is kinked intermediate its ends to enable the arms to overlap during pivoting of each linkage arm 102 during movement between the non-fastening and fastening positions.

In the first example fastener 100 of FIGS. 1 to 3, the head 110 is connected to (e.g. secured to or integrally formed with) and is located on the end of a shaft 114. The shaft 114 is mounted with respect to a generally cylindrical housing 116 of the fastener 100. The housing 116 is able to be mounted in the first member A via an externally threaded surface 117. The housing cap 112 is internally threaded 118 for screw mounting onto a respective externally threaded surface 117A at the end of housing 116. Alternatively, the cap 112 may be swaged thereto, or may be connected thereto by one or more grub screws. Whilst in the illustrated embodiment, the housing 116 is mounted to the first member A by external threading 117, it is to be appreciated that the housing can be mounted to member A in other ways, for example, including by gluing, nailing or by being embedded into member A. In another alternative, the housing may be manufactured as an integral part of member A. This may be achieved by machining, drilling or topping member A to the required profiles of the housing. The other components of the fastener may then be mounted with respect to the preformed member A.

The housing is configured such that a portion of the housing protrudes from the member A, with this portion comprising an unthreaded part 117B (FIG. 3A) of the housing external surface, as well as the externally threaded surface 117A to which the housing cap 112 is screw-mounted. This protruding part enables the fastener 100 to extend right through passage P, whereby the head 110 and joint 108 can locate beyond the rear surface R of the second member B (FIG. 2A). This also enables the short arm part 106 to assume a normal (orthogonal or other orientation) whereby it can sit behind and may abut the rear surface R of the second member B (FIG. 2C), as described hereafter.

The shaft 114 enables the head 110 to move towards or away from the housing cap 112 of housing 116. In this regard, the shaft 114 does not rotate but is able to move axially with respect to the housing 116 to cause the head 110 to move towards or away from the housing. In use, movement of the shaft 114 in to the housing, whereby the head 110 moves in towards the cap 112, causes the joint 108 to move laterally out from the shaft 114, whereas movement of the shaft out from the housing, whereby the head moves away from the cap 112, causes the joint to move laterally in towards the shaft.

In effect, the shaft and head are configured to move with respect to the housing 116 along a major axis $A_x$ (FIG. 1C) of the example fastener 100, with the longitudinal axis of the shaft lying along this fastener axis.

The shaft 114 has an externally threaded portion 119 that is arranged to engage with an internally threaded elongate sleeve 120 retained as part of, and supported for rotation within, the housing 116. In this regard, the sleeve 120 is rotatable around its longitudinal axis. When the sleeve 120 is rotated in one direction its causes the shaft 114 to move in to the housing 116, and when the sleeve 120 is rotated in an opposite direction it causes the shaft 114 to move out from the housing.

As shown in FIG. 3B, an end of the sleeve is provided with a slot 122 to enable it to be engaged by a tool (such as a screwdriver) for rotation of the sleeve in use of the fastener. Other profiles (e.g. a hex profile) for engagement by a spanner or socket wrench can be employed in place of slot 122. The sleeve may also protrude from the rear of the housing 116 to enable it to be provided with a handle, pulley or other device attached thereto, to allow it to be activated more easily by hand or by mechanical means (e.g. a motor).

The sleeve 120 may be caused to rotate manually (such as by a hand-held tool) or by a mechanical drive (e.g. a bit of a powered drill).

The sleeve 120 also comprises a flange 124 that projects outwardly from an opposite end of the sleeve and that is arranged to engage with a corresponding seat 126 of the housing to fix the sleeve against axial movement with respect to the housing 116 (i.e. once the housing cap 112 has been affixed on the end of housing 116).

It should be noted that the short arm part 106 is specifically made shorter than the long arm part 104 such that, as the head 110 is caused to move in towards the housing cap 112, the short arm part pivots away from and assumes an orientation whereby it projects normally (orthogonally) with respect to a longitudinal axis of the shaft 114 (FIGS. 1C and 2C). This is the fastening (or locked) position of the fastener 100. The ratio of lengths of the short and long arm parts enables the short arm part 104 to engage and lock against the rearwards facing surface R of the member B to secure it to the member A. Where other ratios are employed (e.g. equal lengths) then an arm orientation that is other than orthogonal can result, although securing of the member B to member A can still occur.

The member B may also be adapted to cooperate with example fastener 100. In this regard, an end of the passage P adjacent the rear surface R of member B may be provided with a curvature around the perimeter of the passage P. As mentioned above, the perimeter of the passage P may be lined with a hard-wearing (e.g. metal) washer W to prevent damage thereto.

FIGS. 4 to 6 show a second example fastener 400. The fastener 400 may again be screw mounted into the member A and is able to be actuated to secure the member B thereto. Alternatively parts of the fastener, such as the housing 416, may be mounted by other means such as by nailing, gluing or by being embedded into member A. In another alternative, the housing may be manufactured as an integral part of member A. This may be achieved by machining, drilling or topping member A to the required profiles of the housing. The other components of the fastener may then be mounted with respect to the preformed member A.

In FIGS. 4 to 6, like reference numerals for the second example fastener 400 are used to those employed for the example fastener 100, except that the prefix numeral "4" will be employed instead of "1". In addition, the parts that are similar to the example fastener 100 will not be redescribed.

In example fastener 400, the housing 416 is able to be fabricated of shorter length. This is because the shaft 414 does not move axially in the housing. Rather, shaft 414 is supported to rotate in the housing 416, and its axial movement is restrained by a flange 415 that projects out from the shaft, intermediate its ends, and that interacts with the housing seat 426. In addition, the slot 422 is now provided on an end of the shaft 414.

Further, the head 410 is internally threaded at 411 to screw-mount and be moved along the threaded portion 419 of shaft 414, as the shaft 414 is rotated, rather than moving in and out with the shaft as it does in example fastener 100.

Again, the second example fastener 400 again is able to releasably secure members A and B together.

The threads between the shaft 114, 414 and sleeve 120 or head 410 may take the form of a worm screw. A worm screw is able to provide a dual function of movement and also to act as a lock for each linkage arm 102, 402. This ability of the worm screw to provide a locking function may be employed, for example, when the arms do not assume an orthogonal orientation in the fastened orientation (FIGS. 1C, 2C and 4C, 4D).

In use, either of the example fasteners 100, 400 is installed in (e.g. screw-mounted into) member A, and is moved into the non-fastening position (FIG. 1A/2A or 4A). Either of the heads 110, 410 is then aligned with and moved through the passage P in member B. Each of the example fasteners 100, 400 is now ready for use to secure members A and B together.

In this regard, the slots 122, 422 are accessed by a tool, the sleeve 120 or shaft 414 is rotated in a given direction, and each head 110, 410 is caused to move in towards the housing cap 112, 412. This causes the joint 108, 408 of each linkage arm 102, 402 to move out, with the short arms 106, 406 acting on and moving the member B towards member A. Eventually the linkage arms 102, 402 reach the fastening (locked) position, whereby the short arm parts 106, 406 are normal to the axis $A_x$ and abut the rear face R of member B. This secures member B to member A.

When a plurality of evenly spaced linkage arms 102, 402 are employed, the action of the linkage arms, as they move toward and reach an orthogonal orientation, can cause a self-centering (self-locating) of the fasteners 100, 400 in passage P.

Each of the components of the example fasteners 100, 400 may be fabricated of any suitable material, such as plastic, steel, aluminium, etc. The material selected may relate to the size, purpose and required strength/durability of the example fastener 100, 400.

As has been explained, each of the example fasteners 100, 400 may also secure the member A to the member B before each linkage arm 102, 402 fully reaches the fastening position.

The example fasteners 100, 400 may be non-permanent, self-locating, activated manually, mechanically/electrically (e.g. by use of an electrically powered tool), are simple in design and can be made of a variety of materials depending on the application.

While the above description is concerned with fasteners for use with components in buildings (prefabricated and built on site) it will be understood that the fastener is not limited to such applications. For example, it may be used as a fastener in cabinetry, furniture, machinery, vehicles, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a fastener having at least one of A, B, and C" would include but not be limited to fasteners that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a fastener having at least one of A, B, or C" would include but not be limited to fasteners that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A fastener comprising:
a head configured to move towards or away from a housing, wherein the housing is configured to attach to part of a first member via a threaded connection, and wherein the fastener does not comprise the first member;

a shaft associated with the head, comprising an externally threaded portion that is arranged to engage with an internally elongate sleeve inside the housing, the internally threaded elongate sleeve being rotatable around a longitudinal axis in a first direction to cause movement of the shaft into the housing, and in a second direction to cause movement of the shaft out from the housing; and a linkage assembly comprising at least one linkage arm configured to extend from the head toward the housing, the at least one linkage arm pivotally connected at a first end to the head, wherein, in an unfastened orientation, the head is positioned away from the housing, with the at least one linkage arm extended, and wherein, in a fastened orientation, the head is positioned towards the housing, and the joint of the at least one linkage arm is displaced laterally from the fastener.

2. The fastener of claim 1, wherein the head is associated with the shaft, and the shaft is mounted with respect to the housing to enable the head to move towards or away from the housing.

3. The fastener of claim 2, wherein the shaft is:
able to move axially with respect to the housing to cause the head to move towards or away from the housing.

4. The fastener of claim 3, wherein:
the head is affixed to an end of the shaft, movement of the shaft into the housing causes the head to move towards the housing and the joint to move laterally out from the shaft, and movement of the shaft out from the housing causes the head to move away from the housing and the joint to move laterally in towards the shaft.

5. The fastener of claim 4, wherein the shaft comprises:
a projecting flange that is arranged to engage with a corresponding part of the housing to fix the shaft against axial movement into or out from the housing.

6. The fastener of claim 5, wherein the internally threaded elongate sleeve comprises a flange that projects outwardly from the internally threaded elongate sleeve and that is arranged to engage with a corresponding part of the housing to fix the internally threaded elongate sleeve against the axial movement with respect to the housing.

7. The fastener of claim 5, wherein at least one of:
an end of the internally threaded elongate sleeve is configured to be engaged by a tool for rotation of the internally threaded elongate sleeve in use of the fastener; or
an end of the shaft is configured to be engaged by a tool for rotation of the shaft in use of the fastener.

8. The fastener of claim 1, wherein the at least one linkage arm comprises:
a first linkage portion comprising the first end that is pivotally connected to the head,
wherein another end of the first linkage portion and an end of a second linkage portion are pivotally connected together to define the joint.

9. The fastener of claim 8, wherein the first linkage portion is shorter than the second linkage portion.

10. The fastener of claim 9, wherein, when the head is associated with a shaft, as the head moves towards the housing, the first linkage portion pivots away from the housing and assumes an orientation that projects the first linkage portion normally with respect to a longitudinal axis of the shaft.

11. The fastener of claim 9, wherein, as the head moves towards the housing, the first linkage portion engages against a rearward facing surface of a second member to secure the second member to the first member.

12. The fastener of claim 1, wherein the head is configured to move towards or away from the housing along an axis of the fastener, and, when the head is associated with a shaft, a longitudinal axis of the shaft aligns with the axis of the fastener.

13. The fastener of claim 1, wherein, when the housing is attached to the first member, a portion of the housing is configured to protrude beyond the first member, and the housing further comprises a cap that is configured to be mounted to the portion.

14. The fastener of claim 13, wherein the first end of the at least one linkage arm is pivotally mounted to the cap.

15. The fastener of claim 1, further comprising:
a plurality of linkage arms that are equidistantly spaced with respect to and around the housing.

16. The fastener of claim 1, wherein the fastener is removably attached to the first member.

17. The fastener of claim 16, wherein the housing of the fastener is mounted within or is formed by a recess preformed in the first member.

18. The fastener of claim 1, further comprising:
a passage of the second member arranged to receive the head and the joint of the at least one linkage arm through the passage.

19. The fastener of claim 1, wherein the passage comprises a hole that extends into or through the second member.

20. The fastener of claim 1, wherein a rear face of the second member adjacent to the passage is lined by a washer.

21. The fastener of claim 1, wherein the second member comprises a wall or a panel into which the passage extends.

22. A fastener system, comprising:
a fastener base of a fastener, comprising a housing, the housing being configured to attach to a first member, distinct from the fastener, via a threaded connection; and
a fastener cap that can be connected to the fastener base, comprising:
a head configured to move towards or away from the housing;
a shaft, coupled to the head, comprising an externally threaded portion that is arranged to engage with an internally threaded elongate sleeve at least partially within the housing, the internally threaded elongate sleeve being rotatable around a longitudinal axis in a first direction to cause movement of the shaft into the housing, and in a second direction to cause movement of the shaft out from the housing; and
a linkage assembly comprising at least one linkage arm configured to extend from the head in the direction of the housing, the at least one linkage arm pivotally connected at a first end to the head, and including a joint,
wherein, in an unfastened orientation, the head is positioned away from the housing, with the at least one linkage arm extended, and
wherein, in a fastened orientation, the head is positioned towards the housing, and the joint of the at least one linkage arm has been displaced laterally in the fastener; and
the first member to which the fastener is attachable.

23. The fastener system of claim 22, wherein the fastener base is attached to the first member during fabrication of the first member.

24. A method, comprising:
attaching a fastener via a threaded connection between a housing of the fastener and a first member, the fastener comprising a movable head configured to move towards or away from the housing of the fastener in response to a shaft, coupled to the head, comprising an externally threaded portion that is arranged to engage with an internally threaded elongate sleeve inside a housing of the fastener, the internally threaded elongate sleeve being rotatable around a longitudinal axis in a first direction to cause movement of the shaft into the housing, configured to move towards or away from the housing, away from the housing;

means for aligning the fastener with a passage in a second member that is arranged to receive, through the passage, the head and a joint located between a first end of at least one linkage means of the fastener and a second end of the at least one linkage means, wherein the at least one linkage means is extendable from the head toward the housing, and is pivotally connected at the first end to the head; and means for moving the head towards the housing, moving the joint laterally away from the fastener and engaging the at least one linkage arm with the second member securing the second member between the at least one linkage arm and the first member.

25. The method of claim 24, wherein the moving the head includes engaging the at least one linkage arm with the second member and urging the at least one linkage arm towards the first member.

26. An apparatus, comprising:

means for attaching a fastener to a first member via a threaded connection, wherein the first member is not part of the fastener;

means for moving a head of a fastener coupled to a shaft comprising an externally threaded portion that is arranged with an internally threaded elongate sleeve inside a housing of the fastener, the internally threaded elongate sleeve being rotatable around a longitudinal axis in a first direction to cause movement of the shaft into the housing, and in a second direction to cause movement of the shaft out from the housing, configured to move towards or away from the housing, away from the housing;

means for aligning the fastener with a passage in a second member that is arranged to receive, through the passage, the head and a joint located between a first end of at least one linkage means of the fastener and a second end of the at least one linkage means, wherein the at least on linkage means of the fastener and a second end of the at least one linkage means, wherein the at least one linkage means is extendable from the head toward the housing, and is pivotally connected at the first end to the head; and means for moving the head towards the housing, moving the joint laterally away from the fastener and engaging the at least one linkage arm with the second member securing the second member between the at least one linkage arm and the first member.

\* \* \* \* \*